UNITED STATES PATENT OFFICE.

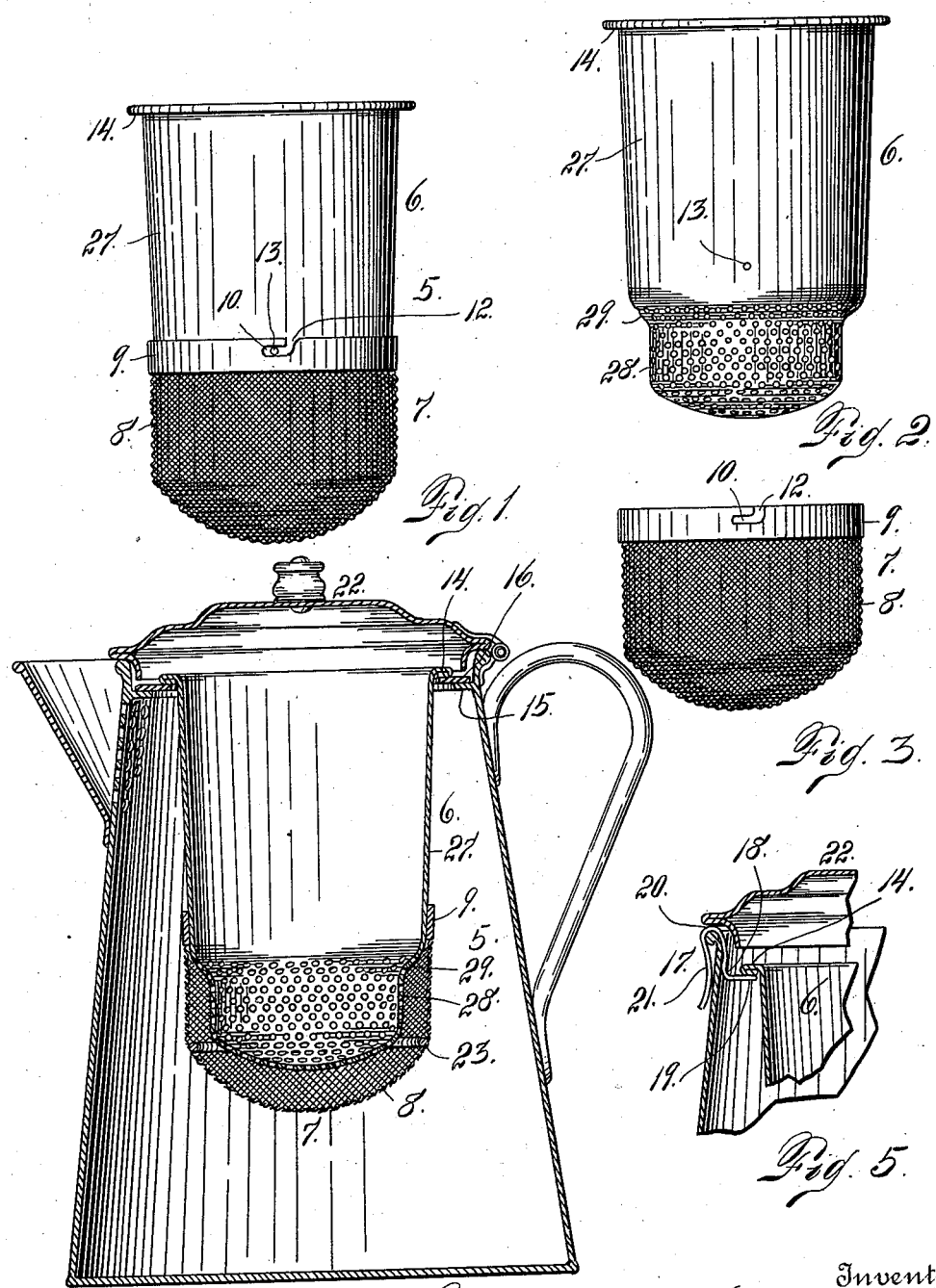

KATHERINE MAYER, OF DENVER, COLORADO.

STRAINER OR PERCOLATOR ATTACHMENT FOR COFFEE-POTS.

1,012,680.  Specification of Letters Patent.  Patented Dec. 26, 1911.

Application filed February 11, 1910. Serial No. 543,330.

*To all whom it may concern:*

Be it known that I, KATHERINE MAYER, a citizen of the United States, residing in the city and county of Denver and State of Colorado, have invented certain new and useful Improvements in Strainer or Percolator Attachments for Coffee-Pots; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in strainer attachments for coffee pots whereby a straining or percolating effect is produced.

This device consists of a body member suspended within the coffee pot and preferably composed of aluminum. Its lower portion is finely perforated, the perforated part commencing at some distance above its lower extremity and extending entirely across the bottom. Detachably connected with the body member outside of the same and surrounding its lower perforated portion is a wire cloth member through which the liquid must pass after leaving the perforated lower portion of the body member, the two strainer portions being suitably separated to prevent clogging or the stopping up of the perforated or wire cloth parts. The upper part of the wire mesh member consists of a metallic band slotted on opposite sides to interlock with pins attached to the body member, forming a sort of bayonet-joint connection whereby the wire cloth member is readily attachable and detachable.

In order that the strainer may be adapted for use with coffee pots varying in size within reasonable limits, provision is made for employing flat rings of varying width which rest upon the ledge at the top of the coffee pot, where the latter is equipped with a ledge. Where, however, there is no ledge, suitable clips may be employed which are adapted to perform a similar function.

Having briefly outlined my improved construction I will proceed to describe the same in detail, reference being made to the accompanying drawing in which is illustrated an embodiment thereof.

In this drawing: Figure 1 is a side elevation in detail of my improved coffee strainer or percolator. Fig. 2 is a similar view of the body member. Fig. 3 is an elevation of the wire cloth member. Fig. 4 is a sectional view taken through a coffee pot with my improved strainer in place. Fig. 5 is a fragmentary view of the same showing another means of supporting the strainer within the coffee pot.

The same reference characters indicate the same parts in all the views.

Let the numeral 5 designate my improved coffee strainer, considered in its entirety and composed of a body member 6 and a wire cloth member 7. This body member is preferably composed of aluminum and its upper part 27 is plain or imperforate while its lower portion 28 is finely perforated and offset inwardly as shown at 29, whereby the extreme lower portion of the body member is of considerably less diameter than the body member above the inward offset 29. The wire mesh member 7 has a wire cloth portion 8 whose upper edge is attached to a ring or band 9 having angle slots 10 open on the upper edge of the ring as shown at 12 and adapted to receive pins 13 with which the body member of the strainer is equipped on opposite sides. These pins are located slightly above the offset 29, whereby the ring or band 9 of the member 7, when the two parts are interlocked, shall have room enough to engage the body member above the offset. While only one pin 13 is illustrated in the drawing it must be understood that there are two pins located on opposite sides of the body member. It will be understood that in order to connect the wire cloth member 7 with the body member, the wire cloth member must be moved upwardly from below the body member until the pins 13 enter the angle slots 10 through the openings 12 on the edge of the ring or band 9. After this takes place it is only necessary to give the member 7 a partial rotary movement on the body member to cause the members to interlock, as heretofore explained.

In order to prevent the possible collapse or partial collapse of the wire cloth member from outward pressure, a stiffening wire or member 23 is applied to the inner surface of the wire cloth portion as illustrated in Fig. 4. This stiffening wire 23 may be connected with the wire cloth in any suitable manner, as by soldering or otherwise, as may be found convenient or desirable.

The upper edge of the body member is provided with an exteriorly projecting flange or rim 14 which in coffee pots of relatively small size, may rest directly upon a ledge 15 where the coffee pot is provided with a ledge. In coffee pots of larger size, flat removable rings 16 may be employed, the said rings resting upon the ledges 15 of the coffee pot and the flanges 14 resting upon said rings which are considerably wider than the ledges of the coffee pot, or in other words extend inwardly beyond the inner edges of the said ledges.

It is evident that by the use of a number of loose rings 16 of corresponding inner diameter, but of varying outer diameter, a single coffee strainer member may be employed with pots of varying sizes within reasonable limits. In order to employ these rings 16, it is necessary that the coffee pot should be equipped with an interiorly projecting ledge forming a support for the ring. With coffee pots not so equipped clips 17 (see Fig. 5), may be employed. These clips are provided with a bend 20, an exteriorly located member 21 projecting downwardly on the outside of the pot, and an interiorly projecting angle member 18 which is bent at right angles as shown at 19 and engages the rim or flange 14 of the body of the strainer. This device 17 is caused to straddle the upper edge of the coffee pot below the cover 22 and extends downwardly both interiorly and exteriorly, as heretofore explained. It is evident that any desired number of these supporting clips may be employed in order that the strainer may be properly suspended or supported against tilting when applied to the coffee pot.

When the device is in use the coffee to be used is placed within the body of the strainer, the coffee pot containing a suitable quantity of water for the purpose and in which the portion of the strainer containing the coffee is immersed. By virtue of the two strainer members, namely, the perforated part of the body of the device and the outer wire cloth part, the liquid coffee is subjected to a double straining operation, thus preventing any grounds from escaping from the body of the strainer. By virtue of the fact that the outer strainer member is located a considerable distance from the inner perforated strainer part, all tendency to clogging or stopping up of the strainer is avoided; and the outer strainer part is maintained in the expanded position by the interiorly located wire 23, as heretofore explained.

When it is desired to clean the strainer device, the outer strainer member 7 may be quickly detached by giving it a partial rotation sufficient to bring the pins 13 of the body member into vertical alinement with the openings 12 of the angle slots 10. This operation gives access to both strainer members for cleansing purposes.

Having thus described my invention, what I claim is:

1. A strainer or percolator for coffee pots, comprising a body member whose upper portion is imperforate and whose lower portion is perforated, the perforated portion being of smaller diameter than the imperforate portion and extending inwardly from the latter by a curved but abrupt offset, and an outer strainer member of finer mesh than the inner strainer member applied to the body of the strainer above the perforated portion of the latter and supported free from the perforated portion, the outer strainer member having a top ring or band in direct engagement with the body of the strainer, while the mesh portion of the outer strainer member occupies a position considerably separated from the perforated portion of the body member, substantially as described.

2. A coffee strainer or percolator, comprising a body portion whose upper part is imperforate and provided with an exteriorly projecting flange at its upper edge, the lower portion of the body member being perforated and of less diameter than the imperforate portion, the body member having an inwardly curved abrupt offset where the perforate and imperforate portions of the body member merge into each other, and an outer strainer member of finer mesh than the inner perforate portion of the body member surrounding the perforated portion and supported free therefrom, the said member being formed sufficiently larger than the perforate portion of the body member to leave a considerable space between the two strainer parts, the upper portion of the outer strainer member having a band or ring surrounding the body member and in direct contact therewith, and means for detachably connecting the outer strainer member with the body member, substantially as described.

3. A strainer or percolator whose upper part is imperforate, and whose lower portion is perforated and of less diameter than the imperforate portion, the body member having an inwardly extending abrupt offset where the perforate and imperforate portions of the body member merge into each other, and an outer strainer member applied to the body member, and surrounding the perforated portion, the said strainer member being supported by the imperforate portion of the body member, entirely free from contact with the perforated portion of the body member, a space being left between all portions of the two strainer members, for the purpose set forth.

In testimony whereof I affix my signature in presence of two witnesses.

KATHERINE MAYER.

Witnesses:
 JNO. G. POWELL,
 JESSIE F. HOBART.

Copies of this patent may be obtained for five cents each, by addressing the "Commissioner of Patents, Washington, D. C."